United States Patent
Oguma et al.

[11] Patent Number: 5,668,066
[45] Date of Patent: Sep. 16, 1997

[54] NEAR INFRARED ABSORPTION FILTER GLASS

[75] Inventors: Hironori Oguma; Kazuo Tachiwana, both of Tokyo, Japan

[73] Assignee: Hoya Corporation, Japan

[21] Appl. No.: 685,572

[22] Filed: Jul. 24, 1996

[30] Foreign Application Priority Data

Jul. 24, 1995 [JP] Japan .................................. 7-186886

[51] Int. Cl.$^6$ ................................................ C03C 3/16
[52] U.S. Cl. ........................ 501/45; 501/47; 501/48; 501/73; 501/79; 501/904
[58] Field of Search .................... 501/45, 47, 48, 501/73, 79, 904

[56] References Cited

U.S. PATENT DOCUMENTS

| | | | |
|---|---|---|---|
| 5,071,795 | 12/1991 | Beall et al. | 501/45 |
| 5,256,604 | 10/1993 | Aitken | 501/48 |
| 5,529,960 | 6/1996 | Aitken et al. | 501/45 |
| 5,529,961 | 6/1996 | Aitken et al. | 501/45 |

*Primary Examiner*—Karl Group
*Attorney, Agent, or Firm*—Nixon & Vanderhye

[57] ABSTRACT

A near infrared absorption filter glass containing

| | |
|---|---|
| $P_2O_5$ | 35~50% |
| $Li_2O$ | 0~5% |
| $Na_2O$ | 0~12% |
| $K_2O$ | 0~20% |
| $Cs_2O$ | 0~20% |
| $R_2O$ (in which R is an alkali metal) | 1.5~20% |
| ZnO | 17~48% |
| MgO | 0~7% |
| CaO | 0~7% |
| SrO | 0~7% |
| BaO | 0~12% |
| R'O (in which R' is an alkaline earth metal) | 0~15% |
| CuO | 0.2~12% | in which % stands for % by weight has excellent transmittance characteristics in the ultraviolet region over conventional phosphate-based glass, has glass stability and processability which enable the mass production, and further has sufficient weatherability.

8 Claims, 1 Drawing Sheet

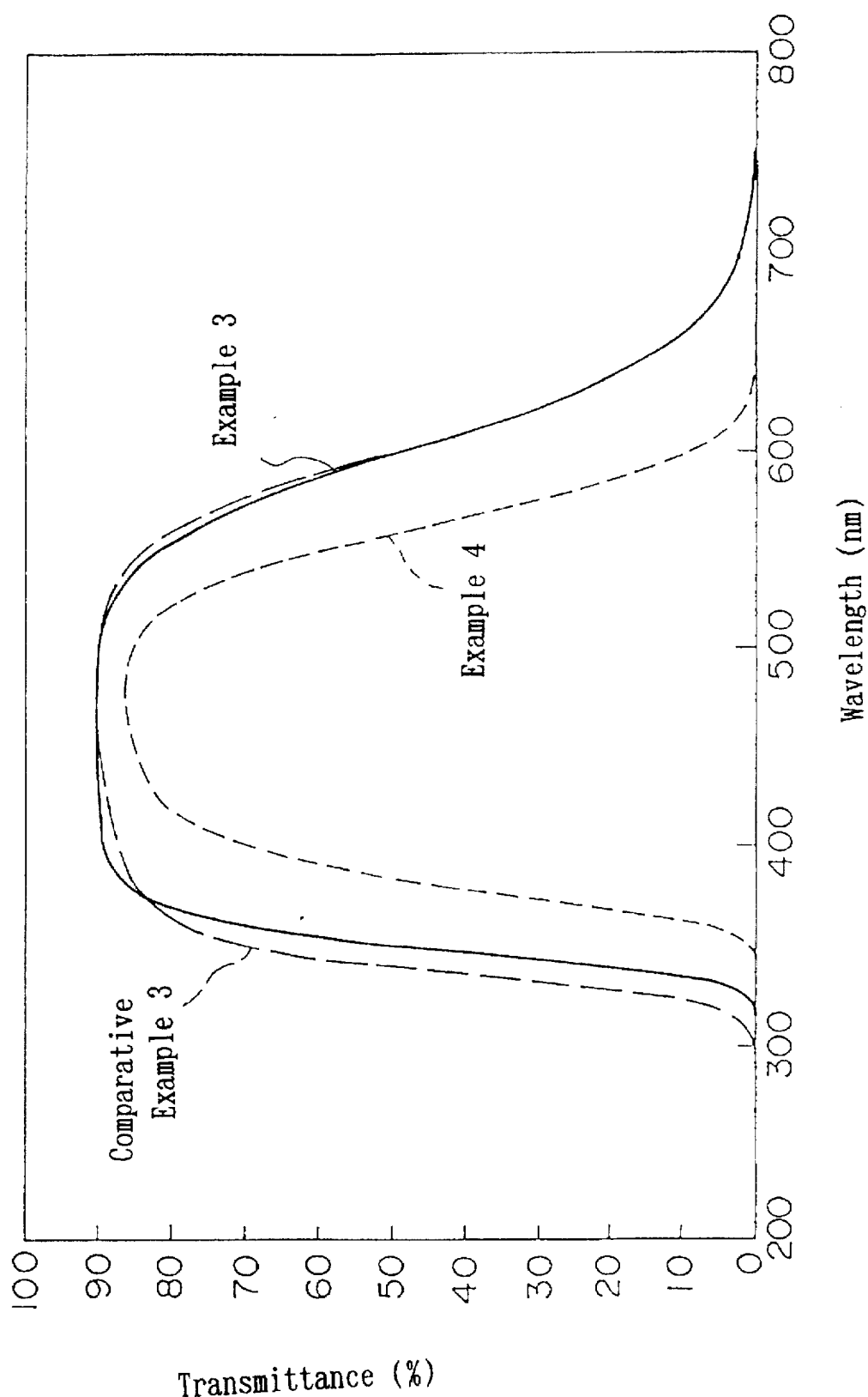

NEAR INFRARED ABSORPTION FILTER GLASS

TECHNICAL FIELD

The present invention relates to near infrared absorption filter glass, more specifically to filter glass which has spectral characteristics that it highly transmits light having a wavelength of 400 to 600 nm and selectively absorbs near infrared light having a wavelength greater than about 600 nm, and which is used particularly for the color correction for a color VTR camera.

PRIOR ART

Infrared absorption filter glass has been studied in various ways and put to practical use. For example, JP-A-62-128943 discloses colored glass formed of 60~90% by weight of $P_2O_5$, 7.5~20% by weight of $Al_2O_3$, 0~15% by weight of $B_2O_3+SiO_2$, 1~25% by weight of $BaO+CaO+SrO$, 0~15% by weight of $Y_2O_3+La_2O_3+ZrO_2+Ta_2O_5+TiO_2$, 0~10% by weight of PbO and 0.4~15.0% by weight of CuO.

Further, JP-A-4-104918 discloses phosphate glass formed of 60~80% by weight of $P_2O_5$, 3~11% by weight of $Al_2O_3$, 3~9% by weight of BaO, 3~20% by weight of $MgO+CaO+BaO+SrO$, 1~5.5% by weight of $Li_2O$, 1~10% by weight of $Li_2O+Na_2O+K_2O$, 0~5% by weight of $SiO_2+B_2O_3$, 0~5% by weight of $ZrO_2+TiO_2+Y_2O_3+La_2O_3$ and 0.2~10% by weight of CuO.

Since, however, the glass disclosed in each of JP-A-62-128943 and JP-A-4-104918 contains a large amount of $P_2O_5$, they are poor in chemical durability and difficult to use for a long period of time. Further, there is another problem that when a relatively large amount of $Al_2O_3$ is incorporated for improving the chemical durability, the melting temperature increases, $Cu^{2+}$ is consequently reduced and the transmittance around 400 nm is low due to $Cu^+$ ion having absorption in an ultraviolet region.

DISCLOSURE OF THE INVENTION

The present inventors have made diligent studies to overcome the above problems, and as a result have found that, when it is attempted to obtain phosphate-based near infrared absorption glass containing CuO, there can be obtained glass which has high transmittance characteristics at 400~600 nm and sharp absorption characteristics at a wavelength greater than 600 nm, useful as a near infrared absorption filter, and which has a small thermal expansion coefficient and excellent chemical durability, by adding a relatively large amount of ZnO and a proper amount of alkali metal oxides to a composition containing 35–50% of $P_2O_5$.

The present invention has been made on the basis of the above finding, and the gist thereof is a near infrared absorption filter glass comprising

| | |
|---|---|
| $P_2O_5$ | 35~50% |
| $Li_2O$ | 0~5% |
| $Na_2O$ | 0~12% |
| $K_2O$ | 0~20% |
| $Cs_2O$ | 0~20% |
| $R_2O$ (in which R is an alkali metal) | 1.5~20% |
| ZnO | 17~48% |
| MgO | 0~7% |
| CaO | 0~7% |
| SrO | 0~7% |
| BaO | 0~12% |
| R'O (in which R' is an alkaline earth metal) | 0~15% |
| CuO | 0.2~12% | in which % stands for % by weight.

BRIEF DESCRIPTION OF THE DRAWING

FIG. 1 shows transmittance curves of glass obtained in Examples 3 and 4 and Comparative Example 3.

PREFERRED EMBODIMENTS OF THE INVENTION

The near infrared absorption filter glass of the present invention comprises 35~50% of $P_2O_5$, 0~5% of $Li_2O$, 0~12% of $Na_2O$, 0~20% of $K_2O$, 0~20% of $Cs_2O$, 1.5~20% of $R_2O$ (in which R is an alkali metal), 17~48% of ZnO and 0.2~12% of CuO.

The reason for the limitation of the amount of each component in composition to the above numerical range is as follows.

In the near infrared absorption filter glass of the present invention, $P_2O_5$ is the most preferred glass network-forming component for increasing the transmittance at 400~600 nm and sharply changing the absorption by $Cu^{2+}$ in a wavelength region greater than 700 nm. When the content thereof is less than 35%, no desired transmittance characteristic is obtained, and further, it is difficult to stably produce the glass since the crystallization tendency of the glass increases. When the above content exceeds 50%, the glass shows a sharp decrease in chemical durability, and the glass intended in the present invention is no longer obtained. Therefore, the amount range of $P_2O_5$ in composition is limited to 35~50%. The amount range of $P_2O_5$ is preferably 37~49%, particularly preferably 40~48%.

In the near infrared absorption filter glass of the present invention, $K_2O$ is a component for improving devitrification resistance and improving the melting properties of glass. When the amount thereof is greater than 20%, the glass is poor in chemical durability and has an increased thermal expansion coefficient. The amount range of $K_2O$ in composition is therefore limited to 0~20%, and it is preferably 0~17%.

The near infrared absorption filter glass of the present invention may contain $Li_2O$, $Na_2O$ and $Cs_2O$ as alkali metal oxides as required in addition to the above $K_2O$.

$Li_2O$, $Na_2O$ and $Cs_2O$ are components for improving the melting properties of the glass and improving devitrification resistance. When the amounts of these components exceed 5%, 12% or 20%, the glass is poor in chemical durability, or the crystallization tendency is intensified. Therefore, the amount range of $Li_2O$ in composition is limited to 0~5%, the amount range of $Na_2O$ in composition is limited to 0~12%, and the amount range of $Cs_2O$ in composition is limited to 0~20%. The amount range of $Li_2O$ is preferably 0~3%, the amount range of $Na_2O$ is preferably 0~8%, particularly preferably 0~6%, and the amount range of $Cs_2O$ is preferably 0~17%, particularly preferably 0~15%.

In the near infrared absorption filter glass of the present invention, the total amount of alkali metal oxides is also limited. The amount range of $R_2O$ (R is an alkali metal) in composition is 1.5~20%. When the amount of $R_2O$ is less than 1.5%, the crystallization tendency increases. On the other hand, when the above amount exceeds 20%, the glass is poor in chemical durability and has an increased thermal expansion coefficient. The amount range of $R_2O$ is preferably 2~17%.

In the near infrared absorption filter glass of the present invention, $K_2O$ has a higher effect of improving the devitrification resistance without greatly impairing the chemical durability as compared with the other alkali metal oxides. It is therefore particularly preferred to use $K_2O$ alone as an alkali metal oxide, in the amount range of 1.5~17% except for a special case where a low melting temperature is required.

In the near infrared absorption filter glass of the present invention, ZnO is an essential component for improving the chemical durability, inhibiting the thermal expansion coefficient from increasing and improving the melting properties. When the amount of ZnO is less than 17%, these effects cannot be produced. On the other hand, when the above amount exceeds 48%, the crystallization tendency is intensified, and it is liable to be difficult to stably produce the glass. The amount range thereof in composition is therefore limited to 17~48%. The amount range of ZnO is preferably 25~45%, particularly preferably 27~42%.

In the near infrared absorption filter glass of the present invention, CuO is an essential component for absorbing near infrared light. The transmittance can be adjusted by incorporating at least 0.2%. However, when the amount thereof is greater than 12%, the crystallization tendency is intensified, and it is hence difficult to mass-produce the glass stably. The amount range of CuO in composition is therefore limited to 0.2 to 12%. The amount range of CuO is preferably 0.2 to 10%, particularly preferably 0.2 to 8%.

In the near infrared absorption filter glass of the present invention, $As_2O_3$ is not an essential component, but it is a component effective for stably maintaining $Cu^{2+}$ and has an effect on improving the transmittance around 400 nm. In particular, when the content of alkali metal oxides in composition is smaller than 12 mol %, it is preferred to incorporate $As_2O_3$. When the content thereof is greater than 6 wt %, not only the crystallization tendency is intensified, but the glass is poor in chemical durability. The amount range of $As_2O_3$ in composition is therefore limited to 0~6%, and it is particularly preferably 0.05~5%.

$B_2O_3$ may be incorporated up to 10% for improving the chemical durability. However, when the amount thereof exceeds 10%, not only no desired transmittance characteristic is obtained, but also the chemical durability reversely deteriorates. The amount range of $B_2O_3$ in composition is therefore limited to 0~10%. The amount range of $B_2O_3$ in composition is preferably 0~8%.

$Al_2O_3$ is a component for improving the chemical durability, and it may be incorporated up to 5%. When the amount thereof is greater than 5%, the crystallization tendency is intensified, and the glass shows poor melting properties. The amount range of $Al_2O_3$ in composition is therefore limited to 0~5%. The amount range of $Al_2O_3$ in composition is preferably 0.5~3%.

MgO, CaO and SrO improve the chemical durability by incorporating them in a small amount. However, when the amount of each is greater than 7%, the glass deteriorate in melting properties and devitrification. Therefore, the amount range of MgO in composition is limited to 0~7%, the amount range of CaO in composition is limited to 0.0~7%, and the amount range of SrO in composition is limited to 0~7%. The amount of each is preferably 0~5%.

BaO has an effect on the improvement of devitrification resistance when incorporated in a small amount. However, when the amount thereof is greater than 12%, the glass shows poor melting properties. The amount range of BaO in composition is therefore limited to 0~12%, and it is preferably 0~8%.

The above MgO, CaO, SrO and BaO belong to alkaline earth metal oxides, and the total amount of alkaline earth metal oxides is also essential in the near infrared absorption filter glass of the present invention. The amount range of R'O (R' is an alkaline earth metal) in composition is limited to 0~15%. The reason therefor is that when the amount of R'O is greater than 15%, the glass shows not only poor melting properties but poor chemical durability. The amount range of R'O in composition is preferably 0.5~10%.

PbO has effects similar to those of ZnO, and ZnO may be replaced with PbO up to 25% of the composition. However, the effect of PbO on improving the chemical durability is lower than that of ZnO, and when the amount of PbO is more than 25%, the chemical durability intended in the present invention can be no longer obtained. The amount range of PbO in composition is therefore limited to 0~25%, and it is preferably 0~20%.

Each of $La_2O_3$, $Y_2O_3$, $Gd_2O_3$ and $Bi_2O_3$ improves the chemical durability when incorporated in a small amount. However, when the amount of any one of $La_2O_3$, $Y_2O_3$ and $Gd_2O_3$ is greater than 3%, or when the amount of $Bi_2O_3$ is greater than 5%, the crystallization tendency is intensified, and it is therefore difficult to stably produce the glass. Therefore, the amount rage of each of $La_2O_3$, $Y_2O_3$ and $Gd_2O_3$ in composition is limited to 0~3%, and the amount range of $Bi_2O_3$ in composition is 0~5%. The amount rage of each of $La_2O_3$, $Y_2O_3$ and $Gd_2O_3$ is preferably 0~2%, and the amount range of $Bi_2O_3$ is preferably 0~4%.

$In_2O_3$ improves the chemical durability in particular by incorporating it in a small amount. When the amount thereof is greater than 7%, the crystallization tendency is intensified. The amount range of $In_2O_3$ in composition is therefore limited to 0~7%, and it is preferably 0~5%.

Like $In_2O_3$, $Sc_2O_3$ improves the chemical durability in particular by incorporating it in a small amount. When the amount thereof is greater than 5%, the crystallization tendency is intensified. The amount range of $Sc_2O_3$ in composition is therefore limited to 0~5%, and it is preferably 0~4%.

Components such as $SiO_2$, $TiO_2$, $ZrO_2$, $Nb_2O_3$, $Ta_2O_5$, etc., are all for improving the chemical durability. When the amount of any one of $SiO_2$, $TiO_2$ and $ZrO_2$ is greater than 3%, or when the amount of any one of $Nb_2O_5$ and $Ta_2O_5$ is greater than 7%, these are liable to remain when melted to form glass, so that it is required to increase the melting temperature, and as a result, it is difficult to stabilize $Cu^{2+}$. Therefore, the amount range of each of $SiO_2$, $TiO_2$ and $ZrO_2$ in composition is limited to 0~3%, the amount range of $Nb_2O_5$ in composition is limited to 0~5%, and the amount range of $Ta_2O_5$ in composition is limited to 0 to 7%. The amount range of each of $SiO_2$, $TiO_2$ and $ZrO_2$ is preferably 0~2%, the amount range of $Nb_2O_5$ is preferably 0~3%, and the amount range of $Ta_2O_5$ is preferably 0~5%.

$Ga_2O_3$, $GeO_2$ and $WO_3$ are components for improving the chemical durability by incorporating them in a small amount. When the amount of any one of $Ga_2O_3$ and $GeO_2$ is greater than 3%, or when the amount of $WO_3$ is greater than 5%, the crystallization tendency is intensified. Therefore, the amount range of each of $Ga_2O_3$ and $GeO_2$ in composition is limited to 0~3%, and the amount range of $WO_3$ in composition is limited to 0~5%. The amount range of each of $Ga_2O_3$ and $GeO_2$ is preferably 0~2%, and the amount range of $WO_3$ is preferably 0~3%.

The above $La_2O_3$, $Y_2O_3$, $Gd_2O_3$, $Bi_2O_3$, $In_2O_3$, $Sc_2O_3$, $SiO_2$, $TiO_2$, $ZrO_2$, $Nb_2O_5$, $Ta_2O_5$, $Ga_2O_3$, $GeO_2$ and $WO_3$ will be generically referred to as high-valence metal oxides hereinafter. When the total amount of the high-valence metal oxides is greater than 10%, not only the melting properties of the glass are deteriorated, but also the crystallization tendency is intensified. The total amount of the high-valence metal oxides is therefore preferably 0~10%.

SnO is a component for improving the chemical durability of the glass. When the amount thereof is greater than 5%, the glass deteriorates in transmittance characteristic, and the crystallization tendency is intensified. The amount range of SnO in composition is therefore limited to 0~5%, and it is preferably 0~3%.

$Sb_2O_3$ is a component for stabilizing $Cu^{2+}$ and improving the devitrification resistance. When the amount thereof is greater than 25%, the glass deteriorates in weatherability. The amount range of $Sb_2O_3$ in composition is therefore limited to 0~25%, and it is preferably 0 to 15%.

$CeO_2$ may be used as an agent for oxidizing CuO. When the amount thereof exceeds 2%, the glass deteriorates in transmittance characteristics in ultraviolet region. The amount range of $CeO_2$ in composition is therefore limited to 0~2%, and it is preferably 0~1%.

Further, F is a component effective for decreasing the melting temperature and obtaining stable coloring. The amount range thereof in which it neither intensifies the crystallization tendency nor increases the thermal expansion coefficient is up to 20%. The amount range thereof in composition is therefore limited to 0~20%, and it is preferably 0~15%. F may be fed by replacing part of oxides with fluoride.

The near infrared absorption filter glass having the above composition, provided by the present invention, has characteristic features that (a) it highly transmits light having a wavelength of 400~600 nm and sharply absorbs light having a wavelength larger than 600 nm, that (b) it has a small thermal expansion coefficient ($\alpha_{100-300}$) and causes almost no cracking when processed, and that (c) the difference between the haze values obtained before and after it is held in a relative humidity of 95% at 65° C. for 1,000 hours is small so that it has weatherability sufficient for use for a long period of time.

EXAMPLES

Examples of the present invention will be explained hereinafter.

Examples 1~18

Glass products having glass compositions shown in Tables 1 to 3 were prepared as follows.

As raw materials for glass components, oxide itself, carbonate, nitrate, hydroxide, fluoride, phosphate, etc., were used. For glass of Example 3 for example, $H_3PO_4$, $Al(OH)_3$, $KNO_3$, $BaCO_3$, $CaCO_3$, ZnO, $As_2O_3$ and CuO were used as raw materials. Further, there shall be no limitation to be imposed on the use of complex salts such as aluminum metaphosphate, zinc metaphosphate, etc., as raw materials. Moreover, F may be added up to 20% without increasing the thermal expansion coefficient, and fluoride raw materials shall not be specially limited.

A batch of the above raw materials was well mixed, melted in a platinum crucible at 900°~1,250° C., stirred, defoamed, homogenized, cast into a pre-heated mold and gradually cooled to give glass in the form of a block in each of Examples 1 to 18. Tables 1 to 3 show the glass compositions obtained in Examples 1 to 18.

The transmittance curve, the thermal expansion coefficient ($\alpha_{100-300}$), the Liquidus temperature (°C.) and the haze value difference (%) of the glass obtained in each of Examples 1 to 18 were determined by the following methods.

(1) Transmittance Curve

Measured with a Shimadzu spectrophotometer UV3101-PC.

(2) Thermal Expansion Coefficient ($\alpha_{100-300}$)

Measured for a thermal expansion coefficient at 100°~300° C. with a thermomechanical analysis apparatus.

(3) Liquidus Temperature (°C.)

Maintained in a temperature-gradient furnace for 30 minutes and determined by the observation through a microscope for crystals.

(4) Haze Value Difference (%)

In the present invention, the haze value difference was used as an index for the weatherability of glass. A mirror-polished sample having a thickness of 1 mm was prepared from a glass block, placed under accelerated testing conditions (maintained at a 65° C.—90% relative humidity for 1,000 hours), and measured for a haze value difference ΔH with a haze meter (%) (based on JIS standard: K6714) before and after the treatment to digitize the degree of deterioration of the glass surface.

The above haze values (H) were determined on the basis of the following equation.

H=Td/Tt×100 (%)

Tt: Total light transmittance (%)

Td: Diffusion transmittance (%)

The samples were measured for transmittance curves to show that the glass products obtained in Examples 1 to 18 highly transmitted light having a wavelength of 400~600 nm and sharply absorbed light having a wavelength of greater than 600 nm so that they were suitable as near infrared absorption filter glass. FIG. 1 shows the transmittance curves of the glass products obtained in Examples 3 and 4 as typical examples.

As shown in Tables 1 to 3, further, the glass products obtained in Examples 1 to 18 had a thermal expansion coefficient $\alpha_{100-300}$ of less than 130 to show that they were almost free from causing the problems of cracking or breaking, which takes place when glass is processed or polished.

As shown in Tables 1 to 3, further, the glass products obtained in Examples 1 to 18 had a liquidus temperature of lower than 900° C. to show that they have devitrification resistance such that they can be stably mass-produced.

As shown in Tables 1 to 3, further, the glass products obtained in Examples 1 to 18 had a haze value difference ΔH (%) of less than 2.5%, or had remarkably superior weatherability, to show that they retain stable performances for a long period of time under general use conditions of VTR cameras, etc.

TABLE 1

| Component | Example No. 1 | 2 | 3 | 4 | 5 | 6 |
|---|---|---|---|---|---|---|
| $P_2O_5$ | 48.0 | 41.0 | 44.0 | 45.0 | 45.0 | 45.0 |
| $B_2O_3$ | | 4.0 | | | | |
| $Al_2O_3$ | 2.0 | 1.0 | 2.0 | 1.0 | 2.0 | |
| $Li_2O$ | | 1.0 | | | | |
| $Na_2O$ | 3.0 | | | | | |
| $K_2O$ | 6.0 | 7.5 | 9.0 | 7.0 | 9.0 | 8.5 |
| $Cs_2O$ | 1.0 | | | | | 2.0 |
| $R_2O^*$ | 10.0 | 8.5 | 9.0 | 7.0 | 9.0 | 10.5 |
| MgO | | | | 1.0 | 1.0 | |
| CaO | | 2.0 | 2.0 | 2.0 | | 0.5 |
| SrO | | | | 2.0 | | |
| BaO | 2.5 | 5.0 | 3.0 | 2.0 | 4.0 | 3.0 |
| $R'O^{**}$ | 2.5 | 7.0 | 5.0 | 7.0 | 5.0 | 3.5 |
| ZnO | 33.5 | 35.5 | 37.0 | 30.5 | 28.0 | 35.0 |
| PbO | | | | | 7.0 | |
| $As_2O_3$ | 1.0 | 1.0 | 1.0 | 2.0 | 1.0 | 0.5 |
| $La_2O_3$ | | | | | | 0.5 |
| $Y_2O_3$ | | 1.0 | | | | |
| $Gd_2O_3$ | | | | | | |
| $Bi_2O_3$ | | | | | | |
| $In_2O_3$ | | | | | | 2.0 |
| $Sc_2O_3$ | | | | | | |
| $Ga_2O_3$ | | | | | | |
| $GeO_2$ | | | | | | |
| $SiO_2$ | | | | | | |
| $TiO_2$ | | | | | | 2.0 |
| $ZrO_2$ | | | | | | |
| $Nb_2O_5$ | | | | | | |
| $Ta_2O_5$ | | | | | | |
| $WO_3$ | | | | | | |
| High-valence metal oxide | 0 | 1.0 | 0 | 0 | 0 | 4.5 |
| SnO | 1.0 | | | | | |
| $Sb_2O_3$ | | | | | 0.5 | |
| $CeO_2$ | | | | | | |
| CuO | 2.0 | 1.0 | 2.0 | 7.5 | 2.5 | 1.0 |
| Total | 100.0 | 100.0 | 100.0 | 100.0 | 100.0 | 100.0 |
| F content | 0.0 | 0.0 | 0.0 | 0.0 | 0.0 | 0.0 |
| α100–300 | 119 | 107 | 108 | 103 | 114 | 106 |
| Liquidus Temp. (°C.) | 700 | 780 | 760 | 835 | 790 | 840 |
| Haze value (%) | 0.6 | 0.7 | 0.4 | 1.2 | 0.5 | 1.1 |

*$R_2O$: $Li_2O$ + $Na_2O$ + $K_2O$ + $Li_2O$
**$R'O$: MgO + CaO + SrO + BaO

TABLE 2

| Component | Example No. 7 | 8 | 9 | 10 | 11 | 12 |
|---|---|---|---|---|---|---|
| $P_2O_5$ | 45.0 | 47.0 | 44.0 | 44.0 | 39.0 | 44.0 |
| $B_2O_3$ | | | | | 6.0 | |
| $Al_2O_3$ | | 1.0 | 2.0 | 2.0 | 1.0 | 1.0 |
| $Li_2O$ | | | | | | |
| $Na_2O$ | | 2.0 | | | | |
| $K_2O$ | 10.5 | 7.0 | 9.0 | 9.0 | 6.0 | 16.0 |
| $Cs_2O$ | | | | | | |
| $R_2O^*$ | 10.5 | 9.0 | 9.0 | 9.0 | 6.0 | 16.0 |
| MgO | | 1.0 | | | | |
| CaO | 2.0 | 2.0 | 2.0 | 2.0 | 2.0 | |
| SrO | | 1.0 | | | | 2.0 |
| BaO | 2.0 | 3.0 | 3.0 | 3.0 | 5.0 | 3.0 |
| $R'O^{**}$ | 4.0 | 7.0 | 5.0 | 5.0 | 7.0 | 5.0 |
| ZnO | 35.0 | 31.0 | 34.0 | 34.0 | 36.5 | 30.0 |
| PbO | | | | | | |
| $As_2O_3$ | 0.5 | 1.0 | 1.0 | 1.0 | 1.0 | 0.0 |
| $La_2O_3$ | | | | | | |
| $Y_2O_3$ | | | | | | |
| $Gd_2O_3$ | 2.0 | | | | | |

TABLE 2-continued

| Component | 7 | 8 | 9 | 10 | 11 | 12 |
|---|---|---|---|---|---|---|
| Bi2O3 | | | 3.0 | | | |
| In2O3 | | | | | | 2.0 |
| Sc2O3 | 2.0 | | | | 1.5 | |
| Ga2O3 | | | | 2.0 | | |
| GeO2 | | | | 1.0 | | |
| SiO2 | | | | | | |
| TiO2 | | | | | | |
| ZrO2 | | 1.0 | | | | |
| Nb2O5 | | | | | 1.0 | |
| Ta2O5 | | 1.0 | | | | |
| WO3 | | | | | | |
| High-valence metal oxide | 4.0 | 2.0 | 3.0 | 3.0 | 2.5 | 2.0 |
| SnO | | | | | | |
| Sb2O3 | | | | | | |
| CeO2 | | | | | | |
| CuO | 1.0 | 2.0 | 2.0 | 2.0 | 1.0 | 2.0 |
| Total | 100.0 | 100.0 | 100.0 | 100.0 | 100.0 | 100.0 |
| F content | 0.0 | 0.0 | 0.0 | 0.0 | 0.0 | 0.0 |
| α100~300 | 103 | 109 | 111 | 107 | 99 | 129 |
| Liquidus Temp. (°C.) | 845 | 850 | 770 | 840 | 850 | 820 |
| Haze value (%) | 0.2 | 1.1 | 0.4 | 0.3 | 1.0 | 2.1 |

*R2O: Li2O + Na2O + K2O + Li2O
**R'O: MgO + CaO + SrO + BaO

TABLE 3

| Component | 13 | 14 | 15 | 16 | 17 | 18 |
|---|---|---|---|---|---|---|
| P2O5 | 42.8 | 49.0 | 44.0 | 45.0 | 44.7 | 42.0 |
| B2O3 | | | | | | 2.0 |
| Al2O3 | 1.0 | 3.0 | 2.0 | 1.0 | | 0.5 |
| Li2O | | 2.0 | | | LiF: 4.3 | |
| Na2O | | | | 7.0 | | 1.0 |
| K2O | 6.7 | 3.0 | 8.0 | 2.0 | K2O:1.5 KF:3.5 | |
| Cs2O | | | | | | 14.0 |
| R2O* | 6.7 | 5.0 | 8.0 | 9.0 | 1.5 | 15.0 |
| MgO | | | | | | |
| CaO | 2.0 | | 2.0 | | CaF2:2.0 | |
| SrO | 1.0 | | | | SrF2:1.0 | 3.0 |
| BaO | 5.2 | | 3.0 | | BaF2:3.0 | 6.8 |
| R'O** | 8.2 | 0 | 5.0 | 0 | 0 | 9.8 |
| ZnO | 24.3 | 31.0 | 20.0 | 44.0 | ZnO:18 ZnF2:20 | 30.0 |
| PbO | | | 18.0 | | | 7.0 |
| As2O3 | 0.5 | 2.0 | 1.0 | 0.0 | 1.0 | 0.2 |
| La2O3 | | | | | | |
| Y2O3 | | | | | | |
| Gd2O3 | | | | | | |
| Bi2O3 | | | | | | |
| In2O3 | | | | | | |
| Sc2O3 | | 2.0 | | | | |
| Ga2O3 | | | | | | |
| GeO2 | | | | | | |
| SiO2 | | 0.5 | | | | |
| TiO2 | | | | | | |
| ZrO2 | | | | | | |
| Nb2O5 | | | | | | |
| Ta2O5 | | | | | | |
| WO3 | | 3.0 | | | | |
| High-valence metal oxide | 0 | 5.5 | 0 | 0 | 0 | 0 |
| SnO | | | | | | |
| Sb2O3 | 15.0 | | | | | |
| CeO2 | | 0.5 | | | | |
| CuO | 1.5 | 4.0 | 2.0 | 1.0 | 1.0 | 0.5 |
| Total | 100.0 | 100.0 | 100.0 | 100.0 | 100.0 | 100.0 |

TABLE 3-continued

| | No. Example | | | | | |
|---|---|---|---|---|---|---|
| Component | 13 | 14 | 15 | 16 | 17 | 18 |
| F content | 0.0 | 0.0 | 0.0 | 0.0 | 0.0 | 0.0 |
| α100–300 | 120 | 98 | 102 | 118 | 128 | 110 |
| Liquidus Temp. (°C.) | 750 | 860 | 760 | 680 | 700 | 810 |
| Haze value (%) | 0.8 | 1.2 | 1.5 | 1.7 | 1.5 | 1.9 |

*R2O: Li2O + Na2O + K2O + Li2O
**R'O: MgO + CaO + SrO + BaO

Comparative Examples 1–3

The glass obtained in Comparative Example 1 was glass whose glass components were included in the components of the present invention but whose $P_2O_5$ content was 54.0% or exceeded the $P_2O_5$ upper limit of 50% in the glass of the present invention.

The glass obtained in Comparative Example 2 was glass whose glass components were included in the components of the present invention but whose alkali metal oxide $R_2O$ content was 23.0% or exceeded the $R_2O$ upper limit of 20% in the glass of the present invention.

The glass obtained in Comparative Example 3 was phosphate-based glass described in Example 1 of JP-A-4-104981, which contained more than 60% of $P_2O_5$ and contained a relatively large amount of $Al_2O_3$.

Table 4 shows the detailed composition of the glass products obtained in these Comparative Examples 1 to 3.

FIG. 1 shows the transmittance curve of the glass in Comparative Example 3 out of the glass products obtained in these Comparative Examples.

As is clearly shown in FIG. 1, when the transmittance of the glass obtained in Comparative Example 3 and the transmittance of the glass obtained in Example 3 at wavelengths of 500 nm and 700 nm are overlapped, the transmittance of the glass obtained in Comparative Example 3 around 400 nm is lower. In the weatherability test, the glass obtained in Comparative Example 3 was maintained under a 65° C.—90% relatively humidity to show a haze value of 91.5%, and it is seen that the glass obtained in Comparative Example 3 has a problem on the reliability in a long-term use. That is, the glass obtained in Comparative Example 3 was notably inferior to the glass of the present invention in respect of transmittance characteristics and weatherability.

Table 4 shows the thermal expansion coefficient ($\alpha_{100-300}$), the liquidus temperature and the haze value difference ΔH(%) of each of the glass products obtained in Comparative Examples 1 and 2. As is clearly shown in Table 4, there was obtained no product which satisfied both the low thermal expansion coefficient as an index for processability and the low haze value difference ΔH(%) as an index for weatherability. That is, the glass obtained in Comparative Example 1 had an $\alpha_{100-300}$ of as low as 117 or had excellent processability, while it had a haze value difference ΔH of 85.0% or had immensely poor weatherability. The glass obtained in Comparative Example 2 had an $\alpha_{100-300}$ of 145 and a have value difference ΔH of 90.0% and therefore it was inferior in both processability and weatherability.

TABLE 4

| | No. Comparative Example | | |
|---|---|---|---|
| Component | 1 | 2 | 3 |
| P2O5 | 54.0 | 46.0 | 71.8 |
| B2O3 | | | 0.5 |
| Al2O3 | 1.0 | | 4.7 |
| Li2O | | 1.0 | 5.0 |
| Na2O | 2.0 | 6.0 | |
| K2O | 9.0 | 16.0 | |
| Cs2O | | | |
| R2O* | 11.0 | 23.0 | |
| MgO | | | 4.8 |
| CaO | | 2.0 | |
| SrO | 1.0 | | |
| BaO | 7.0 | 3.0 | 8.9 |
| R'O** | 8.0 | 5.0 | 13.7 |
| ZnO | 23.0 | 27.0 | |
| PbO | | | |
| As2O3 | 1.5 | 1.0 | 0.0 |
| La2O3 | | | |
| Y2O3 | | | |
| Gd2O3 | | | |
| Bi2O3 | | | |
| In2O3 | | | |
| Sc2O3 | | | |
| Ga2O3 | | | |
| GeO2 | | | |
| SiO2 | | | |
| TiO2 | | | |
| ZrO2 | | | |
| Nb2O5 | | | |
| Ta2O5 | | | |
| WO3 | | | |
| High-valence metal oxide | 0 | 0 | 0 |
| SnO | | | |
| Sb2O3 | | | |
| CeO2 | | | |
| CuO | 1.5 | 2.0 | 4.3 |
| Total | 100.0 | 100.0 | 100.00 |
| F content | 0.0 | 0.0 | 0.0 |
| α100–300 | 117 | 145 | 118 |
| Liquidus Temp. (°C.) | 680 | 660 | 850 |
| Haze value (%) | 85.0 | 90.0 | 91.5 |

*R2O: Li2O + Na2O + K2O + Li2O
**R'O: MgO + CaO + SrO + BaO

As explained above, the near infrared absorption filter glass of the present invention has excellent transmittance characteristics in the ultraviolet region over conventional phosphate-based glass and has glass stability and processability which enable the mass production. Further, the near infrared absorption filter glass of the present invention has sufficient weatherability so that it can retain its performance as a color correction filter of a color VTR camera for a long period of time.

We claim:

1. A near infrared absorption filter glass comprising

| | |
|---|---|
| $P_2O_5$ | 35–50% |
| $Li_2O$ | 0–5% |
| $Na_2O$ | 0–12% |
| $K_2O$ | 0–20% |
| $Cs_2O$ | 0–20% |
| $R_2O$ (in which R is an alkali metal) | 1.5–20% |
| ZnO | 17–48% |
| MgO | 0–7% |
| CaO | 0–7% |
| SrO | 0–7% |
| BaO | 0–12% |
| R'O (in which R' is an alkaline earth metal) | 0–15% |
| CuO | 0.2–12% | in which % stands for % by weight.

2. The near infrared absorption filter glass of claim 1, wherein the near infrared absorption filter glass contains

| | |
|---|---|
| $P_2O_5$ | 37–49% |
| $Li_2O$ | 0–3% |
| $Na_2O$ | 0–8% |
| $K_2O$ | 0–17% |
| $Cs_2O$ | 0–17% |
| $R_2O$ (in which R is an alkali metal) | 2–17% |
| ZnO | 25–45% |
| MgO | 0–5% |
| CaO | 0–5% |
| SrO | 0–5% |
| BaO | 0–8% |
| R'O (in which R' is an alkaline earth metal) | 0.5–10% |
| CuO | 0.2–10% | in which % stands for % by weight.

3. The near infrared absorption filter glass of claim 1, wherein the near infrared absorption filter glass contains

| | |
|---|---|
| $P_2O_5$ | 40–48% |
| $Li_2O$ | 0–3% |
| $Na_2O$ | 0–6% |
| $K_2O$ | 0–17% |
| $Cs_2O$ | 0–15% |
| $R_2O$ (in which R is an alkali metal) | 2–17% |
| ZnO | 27–42% |
| MgO | 0–5% |
| CaO | 0–5% |
| SrO | 0–5% |
| BaO | 0–8% |
| R'O (in which R' is an alkaline earth metal) | 0.5–10% |
| CuO | 0.2–10% | in which % stands for % by weight.

4. The near infrared absorption filter glass of any one of claim 1, wherein the near infrared absorption filter glass contains 0.05 to 5% by weight of $As_2O_3$.

5. The near infrared absorption filter glass of any one of claim 1, wherein the near infrared absorption filter glass contains, as arbitrary components,

| | |
|---|---|
| $B_2O_3$ | 0–10% |
| $Al_2O_3$ | 0–5% |
| PbO | 0–25% |
| $La_2O_3$ | 0–3% |
| $Y_2O_3$ | 0–3% |
| $Gd_2O_3$ | 0–3% |
| $Bi_2O_3$ | 0–5% |
| $In_2O_3$ | 0–7% |
| $Sc_2O_3$ | 0–5% |
| $SiO_2$ | 0–3% |
| $TiO_2$ | 0–3% |
| $ZrO_2$ | 0–3% |
| $Nb_2O_5$ | 0–5% |
| $Ta_2O_5$ | 0–7% |
| $Ga_2O_3$ | 0–3% |
| $GeO_2$ | 0–3% |
| $WO_3$ | 0–5% |
| SnO | 0–5% |
| $Sb_2O_3$ | 0–25% |
| $CeO_2$ | 0–2% |
| F | 0–20% | in which % stands for % by weight.

6. The near infrared absorption filter glass of any one of claim 1, wherein the near infrared absorption filter glass contains $Al_2O_3$ 0.5–3%.

7. The near infrared absorption filter glass of any one of claim 1, wherein the near infrared absorption filter glass contains $K_2O$ alone as the alkali metal oxide $R_2O$ and its amount range is 1.5–17%.

8. The near infrared absorption filter glass of any one of claim 1, wherein the near infrared absorption filter glass has a thermal expansion coefficient $\alpha_{100\text{-}300}$ of $130\times10^{-7}/°C$. or less, and the near infrared absorption filter glass shows a haze value difference (%) of 2.5% or less when measured before and after the near infrared absorption filter glass is maintained at a relative humidity of 90% at 64° C. for 1,000 hours.

\* \* \* \* \*